United States Patent Office 2,793,189
Patented May 21, 1957

2,793,189

DRILLING FLUIDS AND EMULSIFIERS THEREFOR

Albert G. Schuessler, Oklahoma City, Okla., assignor to Swift & Company, Chicago, Ill., a corporation of Illinois, and Mud Control Laboratories, Inc., Oklahoma City, Okla., a corporation of Delaware, jointly No Drawing. Application July 18, 1955,
Serial No. 522,836

20 Claims. (Cl. 252—8.5)

This invention, in general, relates to water-in-oil emulsions having application in rotary drilling of oil and gas wells and to an emulsifying composition for said fluids. More specifically, the invention relates to a stable emulsion having as the continuous external phase, crude petroleum oil or a refined fraction thereof such as diesel distillate, and an internal dispersed phase consisting of bentonite or clay solids in water or preferably whole mud from conventional drilling operations, to methods of rotary drilling of oil and gas wells using said emulsion, and to an emulsifier comprising a metal salt of sulfated sperm oil and lecithin.

In usual rotary drilling practice and well completion techniques, an aqueous fluid or an oil-in-water emulsion containing dispersed solids is used to drill oil bearing sands and as the completion fluid. It has frequently been observed that, following usual completion practices with these fluids, the productivity of the well is considerably lower than initially indicated by drill stem tests taken immediately following initial drilling of the pay sand. This failure to attain production levels comparable to that indicated by drill stem tests is authoritatively ascribed to the effects of invasion of the productive zones by filtrate from the drilling fluid. The amount of damage to permeability caused by the mud filtrate invasion appears to vary directly as the time the mud is in contact with the pay zone and inversely as the permeability of the sand.

In productive sands which contain intergranular, "clayey" dirt, of common occurrence in sands of the Pennsylvania series, the generally accepted explanation of this adverse effect is based on the observation that the permeability of cored samples of these sands is adversely affected through swelling of intergranular clays by filtrate from conventional sodium base drilling fluids which generally contain a high concentration of sodium carbonate in the aqueous phase. Sands having permeability of 125 millidarcys or more are damaged to some extent but will usually clear up in a short time. Sands of approximately 60 millidarcys can usually be drilled and a drill stem test taken before much harm is done, but by the time the pipe is set and the well completed, 25–50% of the permeability will have been lost. Sands of 30 millidarcys or less are as a rule blocked off by the time the well is completed and frequently fail to produce commercially even though core analysis has indicated good potential yield. However, a sand may be relatively clean and free of yielding clay inclusions, but if it is of low permeability, it nevertheless may be rendered even less permeable by invasion of water alone since the amount of water that is held by capillary forces will increase as the permeability decreases. Thus, water invasion can magnify many fold the natural high resistance to oil and gas flow of formations of native low permeability. The interaction of carbonate rich filtrates with normal hardness elements present in connate water quite conceivably may contribute also to a reduction in porosity through the precipitation of calcium and magnesium as the carbonates. In any event, damage to pay zones through aqueous fluid invasion from aqueous drilling fluids constitutes a recognized problem, and inasmuch as permeability and water sensitivity of the pay zone may become known only after drilling or coring the formation, the drilling operation should proceed in the presence of a fluid designed to afford maximum protection to the formation.

Thus, as will be apparent from the following description, the emulsions and method of drilling of the present invention are especially adapted for drilling water sensitive pay sands and completion techniques because restoration of original permeability of damage sands is usually not fully realized by remedial measures presently known.

The emulsions of this invention provide advantages which may induce contractors and operators alike to use external oil phase emulsions for drilling formations other than oil-bearing sands. These external oil phase emulsions may be used to drill anhydrite and salt without ill effect to the drilling fluid and have been found to reduce substantially the torque on the drill string, thereby increasing the rate of penetration of the drill bit. The emulsions also exhibit low fluid loss with the result that the formations encountered are not wetted by the drilling fluid. As a result, the bore hole is maintained very close to gauge, and sloughing and heaving of shale formations is materially decreased.

The invention herein described is an improvement on the invention of United States application Serial No. 463,036, filed on October 18, 1954, of which I am a co-inventor with Charles B. Swain. The invention in said application relates to water-in-oil emulsion drilling fluids and their application in drilling techniques. The emulsifier is a polyvalent metal salt of sulfated sperm oil which is most conveniently prepared by base exchange of an inorganic polyvalent metal salt with an alkali metal salt of sulfated sperm oil at the drilling site. It is my discovery that the combination of a small amount of lecithin with the sulfated sperm oil salts previously described improves emulsion stability of water-in-oil drilling fluids and as a consequence reduces fluid loss.

In general, the present invention relates to water-in-oil emulsion drilling and completion fluids, emulsifying compositions for said fluids, methods for preparing said fluids, and applications of said fluids in rotary well drilling techniques. The fluid is a water-in-oil emulsion, the continuous external oil phase comprising petroleum oil, either crude oil or refined fractions thereof, such as diesel distillate. The system is emulsified by a surface active agent comprising a polyvalent metal salt of sulfated sperm oil in combination with lecithin. Dispersed in the fluid are fine solids such as bentonite, clays and/or drilled up solids, and weighting materials, if needed.

The external oil phase emulsion is best prepared by vigorous agitation of gas free petroleum oil, an alkali metal salt of sulfated sperm oil containing lecithin, and a polyvalent metal salt capable of base exchange with alkali salts of sulfated sperm oil. Thereafter, a water base mud is added, and agitation is maintained for at least one hour to improve the characteristics of the external oil phase mud, after which a weighting material such as barium sulfate or iron oxide may be added, if desired. About 0.5% of the alkali salt of sulfated sperm oil and lecithin mixture by volume is sufficient. The upper limit is governed chiefly by economic factors. About 1.5–3 percent of sperm oil and lecithin mixture is generally employed to emulsify the drilling fluids.

The base exchange should take place before the aqueous mud phase is added to the system. Base exchange may be accomplished by agitation of the oil and emulsifier mixture with a concentrated aqueous solution of a polyvalent metal salt or water soluble dry solid if there is some moisture in the oil-emulsifier mixture.

Because the external fluid phase of such a system is a surface active oil, there exists little or no resistance to shear, thereby necessitating the addition of a carrying agent, if it is desired to use weighted material. This carrying agent is a compound which does not in any manner minimize the advantages of the overall system nor will it affect the rheological properties of the total system. It functions only as a carrying agent for the high specific gravity weighting material and is not chemically reactive with either the drilling fluid or the formations of the well bore and, if utilized, may be introduced into the oil phase along with the surface active mixture and polyvalent metal salt prior to addition of the mud phase or at any time thereafter. A suspending agent suggested for use in the drilling fluids of this invention is a purified petroleum sulfonate or crude tall oil pitch. In weighted systems, the addition of 2-3 lbs. of sulfonate per barrel of drilling fluid provides the necessary weight suspension properties.

An oil-in-water emulsion or a water base fluid is generally used for drilling through various formations to the pay sand. However, it has been found that these fluids, when used to drill into the pay sand, lower the yield of many types of producing sands by migration of the filtrate into the producing formation. (See discussion, supra.) For this reason, I prefer to employ the external oil phase emulsion of this invention to drill into pay formations. One embodiment of methods for drilling involves substitution of an external oil phase emulsion in drilling oil bearing formations and completion thereof. This water-in-oil emulsion may be formulated according to the foregoing procedure in a separate pit or tank and pumped into the core to displace hole fluid of the former system.

As an alternative, it may be desirable for economic or other reasons to utilize the oil-in-water drilling fluid in compounding the external oil phase emulsion of this invention. The oil-in-water drilling fluid may be a mechanical dispersion of oil-in-water, or the system may be an emulsion prepared by the use of the alkali metal salts of sulfated sperm oil or other emulsifiers. The effectiveness of the additive of this invention does not appear to be altered by the presence of other emulsifying agents in the system.

The in situ inversion may be achieved by adding thoroughly mixed petroleum oil, polyvalent metal salt, and an alkali salt of sulfated sperm oil and lecithin to the mud system at the pump suction until the percent of petroleum oil exceeds 50 percent of the total mud volume. Agitation in the pump and circulating system provides the necessary mixing to produce a stable water-in-oil drilling mud. If the oil-in-water drilling fluid used prior to inversion is emulsified by an alkali metal salt of sulfated sperm oil with or without lecithin, it may be necessary to merely add amounts of sulfated sperm oil and lecithin in sufficient quantity to refortify the mud system.

The in situ inversion technique comprises the addition of petroleum oil, polyvalent metal salt, and alkali salt of sulfated sperm oil-lecithin mixture to the circulating system, preferably at the pump suction. If, for example, a 60 percent oil phase is desired, the petroleum oil mixture is added at a rate approximating 60 percent petroleum oil and 40 percent fresh water mud drawn from the mud pit. The inverted mud is pumped into the bore and displaces the fluid therein. The displaced fluid discharging to the surface of the bore is channeled partially to the mud pit, and a portion is discarded or run into a reserve pit. In the instant example, 60 percent would be discharged and 40 percent returned to the mud pit to maintain the mud pit level. Since it is undesirable to discharge the water-in-oil emulsion thus formed when the original bore fluid has been completely displaced from the bore, the preferred procedure at this point is to begin return of all of the fluid to the mud pit. In so doing, it is necessary to lower the mud pit level some-time prior to the return of the water-in-oil emulsion fluid to the well surface by decreasing the proportion returning to the mud pit.

Assuming a 1200 barrel system with a 900 barrel hole volume and a 300 barrel pit volume, the inversion would proceed substantially as follows:

If the original mud were a fresh water mud and a 60/40 oil to water ratio is desired, the valves in the system would be adjusted to provide an intake to the pump suction of 60 percent oil containing the aforementioned ingredients and 40 percent of the fresh water mud from the mud pits. As the displaced fresh water mud is discharged to the well surface, 60 percent would be discarded and 40 percent returned to the mud pit to maintain a constant volume in said pit. Sometime prior to complete displacement of the fresh water mud in the hole, the mud pit level should be lowered by 60 percent of its volume or 180 barrels by discharging added amounts of fresh water mud instead of returning said mud to the mud pit. When the discharge shows that the water-in-oil emulsion has returned to the well surface, the discharge valves are closed and all of the displaced fluid is returned to the mud pit. Continued circulation will withdraw the remainder of the fresh water mud from the mud pit, and the addition of oil to the system will be completed when the fresh water mud is exhausted from the mud pit.

If the fresh water mud in the above procedure were a 10 percent oil-in-water emulsion, the petroleum oil mixture would be added at a ratio of 55.5 volumes of oil to 44.5 volumes of the oil-in-water emulsion. The rates of discharge and return to the mud pit would be adjusted accordingly.

More specifically, the water-in-oil emulsions for general applications comprise:

40–80% crude oil by volume containing 1.5–5.0% sulfated sperm oil-lecithin mixture (based by weight on final emulsion)
60–20% water base mud by volume
1–5 lbs. polyvalent metal salt per 40 gallons of oil In the above formulation, it is preferred to keep the oil volume within the limits of 50–70 percent to provide the best rheological properties to the drilling fluid. The viscosity of the fluid is important in its effect upon fluid loss. The optimum oil-water ratio and consequently the viscosity is dependent upon the solids carried by the oil phase and hence cannot be predicted with certainty. For this reason, it is the best practice to run a pilot scale test with a sample of the fresh water mud to be used in compounding the final external oil phase drilling fluid.

The amounts of each polyvalent salt added are subject to variation depending upon the conditions encountered and the particular salt used as a replacement. The salt concentration in the aqueous phase should be at least sufficient to assure base exchange with the sulfated emulsifiers. However, high concentrations in the order of 12,000 to 15,000 parts per million are desirable to further assure base exchange and for the beneficial effects of these salts on oil bearing formations. A conventional fresh water mud which is either lightly or heavily treated with conventional chemicals and of good particle size distribution is desirable as the mud phase.

Preferred polyvalent metal ions for preparation of the external oil phase emulsions of the present invention are in order of effectiveness $Al^{+++}$, $Zn^{++}$, $Pb^{++}$, and $Ca^{++}$.

Calcium hydroxide is preferably included in any of the systems described herein to maintain an excess of calcium ions for purposes described herein and to control acidity in the drilling fluid. Acidity control is particularly important in the case of aluminum chloride which can be corrosive at higher temperatures due to hydrolysis of the aluminum chloride.

In fluids having an oil phase volume in the order of 60 to 70 percent or higher, a mud phase which is high in solids and highly dispersed by means of thinning agents such as caustic and quebracho is desirable for attaining a fluid of acceptable characteristics. The quality, quantity, dispersion and dispersibility of the solids affect the quality of the inverted system. The mud in a 60 percent external oil phase fluid having optimum rheological characteristics should have a high solids content, e. g., 20-30 percent, good particle size distribution, and amenability to infinite particle dispersion following inversion. The same considerations apply to salt saturated muds which may also be inverted by the procedures described herein.

Using a fresh water mud system with average properties and a crude oil, preferably non-paraffinic, in a ratio of 60 percent by volume of oil to 40 percent by volume of mud, the following average properties may be expected:

| | |
|---|---|
| Wt., lbs./gal | 8.0 |
| Viscosity, cpe | 60-80 |
| Initial gels-10' | 0-0 |
| Fluid loss 30' | 0.0-1.0 ml. |
| Surface tension | approximately 4 dynes less than crude oil |

In determining the volume ratio of water base mud to oil the desired centipoise viscosity requirements are estimated in advance. If the mud is to be weighted with clay solids or other weighting agents, a minimum viscosity of 80 centipoises after weighting is preferred. The final viscosity depends upon the specific gravity of the oil, the viscosity of the water base or oil-in-water mud, and non-linear viscosity increase as the percent water base mud is increased. It is generally preferred to prepare a sample mixture before formulating a complete system.

The polyvalent metal salt of sulfated sperm oil may be compounded by the manufacturer instead of the conversion thereto by base exchange with an alkali salt of sulfated sperm oil at the well site. In such an instance, addition of the salts, particularly calcium, is still desirable to flocculate the mud phase solids.

The inverted emulsions are usually stable to ion contamination normally encountered in drilling oil wells. They are insensitive to further addition of calcium or magnesium ions and will tolerate saturation in the aqueous phase by evaporites such as gypsum, anhydrites, and halite without deleterious effect on the emulsions. Unlike many external oil phase drilling fluids, they are capable of dispersing and holding sizeable quantities of solids and may be weighted sufficiently to control high formation pressures.

The presence of calcium ion or other polyvalent metal ions in the inverted emulsion gives a drilling composition which combines the properties of oil base and salt saturated muds. The fluid loss is all oil or oil containing microscopic or submicroscopic particles of water containing polyvalent metal ions. These particles of water containing said ions, particularly calcium ions, inhibit the swelling of intergranular clays in the pay zone by providing the cation-rich environment which is chemically similar to the environment provided by connate water in the pay zone. Moreover, since the invading fluid is substantially surface active oil, it assists in causing the sand to become preferentially oil wet and therefore increases the permeability of the sand in favor of increased production. These benefits are believed to be traceable to the presence of sufficient surface active materials to reduce interfacial forces to such an extent as to assist in the removal of interstitial water including filtrate and invading mud particles.

The emulsified system of this invention may be employed with success in dual completions. Where two or more separate producing sands are to be drilled, the operation through the upper producing sand is the same as that previously described. After the inverted system has been used to drill through the upper producing sand, drilling is continued with the water-in-oil emulsion to provide protection to the upper sand.

The external oil phase emulsions of this invention also have utility as a completion fluid after the pay sand has been drilled. The surface activity of the additive of this invention enhances preferential oil wetting of the pay sand which in turn contributes to improve permeability of the sands to oil. In addition, the presence of polyvalent metal ions, particularly calcium, produces a shrinking effect on intergranular clays which have been hydrated at some time prior to the completion period.

The water-in-oil emulsions of this invention may also be used to advantage as a "killing" fluid in stopping a producing well for a period of time. The fluid will not endanger the productivity of the well by water wetting the productive section.

The active ingredients of the sperm oil additives of this invention are polyvalent metal salts of sulfated esters of fatty alcohols and fatty acids and lecithin. Sulfation of sperm oil is accomplished by reaction of unsaturated esters with concentrated sulphuric acid.

More specifically, the process for producing the modified sperm oil emulsifier involves the reaction of sperm oil and concentrated sulfuric acid in a sulfonator in a ratio of about 3-4 parts by weight of sperm oil and 1 part by weight sulfuric acid. The concentrated acid is added as quickly as possible, but care must be exercised to maintain the temperature below 90° F. Cooling is maintained throughout the entire sulfation period. After all the acid has been added stirring is continued for one hour.

The sulfated oil is then run into a wash tank of 11° Bé. sodium sulfate brine at 110° F. The oil and brine are mixed thoroughly with care to avoid excessive emulsification. The brine is drawn off as quickly as possible. The washed sulfated oil is first partially neutralized by carefully adding 21° Bé. sodium hydroxide until the pH of the mixture is about 4-5. The product is allowed to stand over night.

The following day, the brine layer is drawn from the bottom and caustic soda is added with agitation. The amount of caustic soda added is sufficient to raise the pH of a mixture of 9 parts water and one part of the oil to 6.2-6.7. After final neutralization, the product is finished by adding a small amount of formaldehyde.

In the above procedures, potassium sulfate and hydroxide may be substituted for sodium hydroxide and sodium sulfate to give the corresponding alkali salt of sulfated sperm oil. The alkaline earth salts, i. e., calcium, magnesium, barium, and strontium, are most easily produced by preparation of alkali metal salt according to the above procedure, and mixing the modified sperm oil and a concentrated water solution of salts of the alkaline earths such as the chlorides. By base exchange mechanism, the alkaline earths replace the alkali metals to form the sulfated sperm oil alkaline earth salt. However, the alkaline earth salts, particularly calcium, may be prepared in a manner similar to the procedure for the alkali metal salt by washing with a soluble alkaline earth inorganic salt such as the chloride after acidation of the sperm oil, and addition of the alkaline earth hydroxides in small quantities and at intervals to neutralize the acid sulfated sperm oil.

The following examples are illustrations of surface active mixtures designed for use in compounding water-in-oil emulsion type drilling fluids in the manner previously described. In addition to their utility in the preparation of water-in-oil drilling fluids, compositions containing the alkali metal salts of sulfated sperm oil and lecithin may be used as emulsifiers for drilling fluids of the oil-in-water type. The composition of the surface active additives of this invention varies between about 60 to 95% of the sperm oil salt and 5 to 15% lecithin or a ratio of lecithin to sulfated sperm oil salt between about 1:19 and 1:4.

Example I

| | Parts by weight |
|---|---|
| Sodium salt of sulfated sperm oil | 76 |
| Lecithin | 15 |
| Ebony fat | 9 |

Ebony fat is a surface active mixture of complex compounds obtained from the residue from decolorization of fatty substances such as fatty acids and fatty triglycerides in propane or other liquid, normally gaseous, hydrocarbons. The composition and method for obtaining the same is more fully described in United States Patent No. 2,668,138, issued to John J. Walker and John E. Farbak on February 2, 1954, the disclosure of which is incorporated into this description by reference. Ebony fat may be used in the sulfated sperm oil salt-lecithin mixture in the range of 10–25% by weight.

Example II

| | Parts by weight |
|---|---|
| Sodium salt of sulfated sperm oil | 90 |
| Lecithin | 10 |

Example III

| | Parts by weight |
|---|---|
| Calcium salt of sulfated sperm oil | 90 |
| Lecithin | 10 |

Obviously, many modifications and variations of the invention as hereinbefore set forth may be made without departing from the spirit and scope thereof, and therefore only such limitations should be imposed as are indicated in the appended claims.

I claim:

1. A fluid having application as a well drilling and completion fluid comprising a water-in-oil emulsion containing an emulsifying agent comprising polyvalent metal salt of sulfated sperm oil and lecithin, the ratio of lecithin to sulfated sperm oil salt falling between about 1:19 and 1:4.

2. A fluid having application as a well drilling and completion fluid comprising a water-in-oil emulsion, said emulsion containing an emulsifying agent comprising 85–95% of an alkaline earth salt of sulfated sperm oil and 5–15% of lecithin.

3. A fluid having application as a well drilling and completion fluid comprising a water-in-oil emulsion containing an emulsifying agent comprising lecithin and a polyvalent metal salt of sulfated sperm oil, said polyvalent metal from the group consisting of aluminum, zinc, lead, and calcium, the ratio of lecithin to sulfated sperm oil salt falling between about 1:19 and 1:4.

4. A fluid having application as a well drilling and completion fluid comprising a water-in-oil emulsion containing at least 40 percent oil, said emulsion containing an emulsifying agent comprising an alkaline earth salt of sulfated sperm oil as the major ingredient by weight, and as a minor ingredient by weight, lecithin.

5. A fluid having application as a well drilling and completion fluid comprising a water-in-oil emulsion containing at least 40 percent oil, said emulsion containing an emulsifying agent comprising a polyvalent metal salt of sulfated sperm oil and lecithin, the ratio of lecithin to sulfated sperm oil salt falling between about 1:19 and 1:4, and a calcium electrolyte dissolved in the aqueous phase for minimizing hydration of hydratable intergranular clays in oil bearing sands.

6. A fluid having application as a well drilling and completion fluid comprising a water-in-oil emulsion, said emulsion containing an emulsifying agent comprising 60–85% of a polyvalent metal salt of sulfated sperm oil, 10–25% of a mixture of complex compounds obtained as the residue from propane decolorization of fatty materials, and 5–15% lecithin, solids dispersed therein, and a bivalent metal electrolyte dissolved in the aqueous phase.

7. A fluid having application as a well drilling and completion fluid comprising a water-in-oil emulsion, the oil phase of said emulsion being a liquid hydrocarbon, said emulsion containing an emulsifying agent comprising an alkaline earth salt of sulfated sperm oil and lecithin, the ratio of lecithin to sulfated sperm oil falling between about 1:19 and 1:4.

8. A fluid having application as a well drilling and completion fluid comprising a water-in-oil emulsion containing at least 40 percent oil, the oil phase of said emulsion being a liquid hydrocarbon, said emulsion containing an emulsifying agent comprising an alkaline earth salt of sulfated sperm oil and lecithin, the ratio of lecithin to sulfated sperm oil salt falling between about 1:19 and 1:4.

9. A fluid having application as a well drilling and completion fluid comprising a water-in-oil emulsion containing at least 40 percent oil, said emulsion containing an emulsifying agent comprising lecithin and a polyvalent metal salt of sulfated sperm oil, said polyvalent metal from the group consisting of aluminum, zinc, lead and calcium, the ratio of lecithin to sulfated sperm oil salt falling between about 1:19 and 1:4.

10. A method of drilling oil producing formations with a rotary bit comprising circulation of a drilling fluid to said bit and then to the well surface, said drilling fluid comprising a water-in-oil emulsion with finely divided solids suspended therein and an emulsifier comprising a sulfated sperm oil polyvalent metal salt and lecithin, the ratio of lecithin to sulfated sperm oil salt falling between about 1:19 and 1:4.

11. A method of drilling oil producing formations with a rotary bit comprising circulation of a drilling fluid to said bit and then to the well surface, said drilling fluid comprising a water-in-oil emulsion with finely divided solids suspended therein and an emulsifier comprising a sulfated sperm oil polyvalent metal salt and lecithin, said polyvalent metal from the group consisting of aluminum, zinc, lead, and calcium, the ratio of lecithin to sulfated sperm oil salt falling between about 1:19 and 1:4.

12. A method of drilling oil producing formations with a rotary bit comprising circulation of a drilling fluid to said bit and then to the well surface, said drilling fluid comprising a water-in-oil emulsion with finely divided solids suspended therein and an emulsifier comprising the calcium salt of sulfated sperm oil and lecithin, the ratio of lecithin to sulfated sperm oil salt falling between about 1:19 and 1:4.

13. A method of drilling wells with an oil-in-water drilling fluid and inverting said fluid to a water-in-oil emulsion prior to reaching oil producing sand which comprises addition of petroleum oil to said fluid until the oil phase exceeds at least approximately 50 percent of the total fluid volume, said petroleum oil containing a polyvalent metal salt of sulfated sperm oil and lecithin as emulsifying agents, the ratio of lecithin to sulfated sperm oil salt falling between about 1:19 and 1:4.

14. A method of drilling wells with an oil-in-water emulsion containing as an emulsifier an alkali metal salt of sulfated sperm oil and lecithin and inverting said oil-in-water emulsion prior to reaching oil producing sand which comprises addition of petroleum oil to said emulsion until the oil in said emulsion at least exceeds approximately 50 percent of the total fluid volume, said oil containing an inorganic alkaline earth salt and vigorously agitating the mixture to obtain a water-in-oil emulsion, the ratio of lecithin to sulfated sperm oil salt falling between about 1:19 and 1:4 in the water-in-oil emulsion.

15. A method of drilling wells with an oil-in-water emulsion containing as an emulsifier an alkali metal salt of sulfated sperm oil and lecithin and inverting said oil-in-water emulsion prior to reaching oil producing sand which comprises addition of a liquid hydrocarbon to said emulsion until said liquid hydrocarbon in said emulsion at least exceeds approximately 50 percent of the total fluid volume, said liquid hydrocarbon containing an inorganic alkaline earth salt and vigorously agitating the mixture to obtain a water-in-oil emulsion, the ratio of lecithin to sulfated sperm oil salt falling between about 1:19 and 1:4 in the water-in-oil emulsion.

16. A composition adapted for emulsification of oil and water in a drilling and completion fluid which comprises a mixture of a member from the group consisting of alkali metal salts of sulfated sperm oil and polyvalent metal salts of sulfated sperm oil and lecithin, the ratio of lecithin to sulfated sperm oil salt falling between about 1:19 and 1:4.

17. A composition adapted for emulsification of oil and water in a drilling and completion fluid which comprises a mixture of 85 to 95% by weight of an alkali metal salt of sulfated sperm oil and 5 to 15% by weight of lecithin.

18. A composition adapted for use in emulsification of a water-in-oil drilling and completion fluid which comprises a mixture of a member from the group consisting of alkali metal and polyvalent metal salts of sulfated sperm oil, 60–85 parts by weight; lecithin, 5–15 parts by weight; and a mixture of complex compounds obtained as the residue from propane decolorization of fatty materials, 10–25 parts by weight.

19. A composition adapted for use in emulsification of a water-in-oil drilling and completion fluid which comprises a mixture of an alkali metal salt of sulfated sperm oil and lecithin in a ratio of approximately 9 parts sulfated sperm oil salt to 1 part lecithin.

20. A composition adapted for emulsification of oil and water in a drilling and completion fluid which comprises a mixture of the sodium salt of sulfated sperm oil, 76 parts by weight; lecithin, 15 parts by weight; a mixture of complex compounds obtained as the residue from propane decolorization of fatty materials, 9 parts by weight.

References Cited in the file of this patent

UNITED STATES PATENTS

| | | |
|---|---|---|
| 2,497,398 | Dawson | Feb. 14, 1950 |
| 2,678,320 | Scharf | May 11, 1954 |

OTHER REFERENCES

Emulsion Technology, 2nd edition, pages 15 and 16, pub. 1946 by Chemical Publishing Co., of Brooklyn, N. Y.